(12) United States Patent
Durand et al.

(10) Patent No.: US 9,452,835 B2
(45) Date of Patent: Sep. 27, 2016

(54) METHOD FOR AUTOMATED AND ORDERLY PROCESSING OF LUGGAGE IN AN AIRCRAFT

(71) Applicant: AIRBUS OPERATIONS S.A.S., Toulouse (FR)

(72) Inventors: Yves Durand, Ausonne (FR); Bernard Guering, Montrabe (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 195 days.

(21) Appl. No.: 14/109,424

(22) Filed: Dec. 17, 2013

(65) Prior Publication Data

US 2014/0175229 A1    Jun. 26, 2014

(30) Foreign Application Priority Data

Dec. 17, 2012    (FR) ...................................... 12 62145

(51) Int. Cl.
*B64D 9/00* (2006.01)
*B64F 1/32* (2006.01)

(52) U.S. Cl.
CPC .. *B64D 9/00* (2013.01); *B64F 1/32* (2013.01)

(58) Field of Classification Search
CPC .................................... B64D 9/00; B64F 1/32
See application file for complete search history.

(56) References Cited

U.S. PATENT DOCUMENTS

| 5,365,723 A | 11/1994 | Ramos |
| 6,580,046 B1 * | 6/2003 | Koini ...................... B64F 1/368 209/564 |
| 7,614,585 B2 * | 11/2009 | McCoskey ............ B64C 25/405 14/71.5 |
| 8,202,035 B2 | 6/2012 | Safir |
| 2007/0109127 A1 | 5/2007 | Johnson et al. |
| 2007/0284481 A1 | 12/2007 | Linero |
| 2008/0128248 A1 | 6/2008 | Hoffjann et al. |
| 2013/0186999 A1 | 7/2013 | Huber |

FOREIGN PATENT DOCUMENTS

| DE | 10336721 A1 | 3/2005 |
| DE | 102007023658 A1 | 11/2008 |
| GB | 967266 A | 8/1964 |

OTHER PUBLICATIONS

French Searching Authority, French Search Report for FR1262145 Dated Aug. 6, 2013.

* cited by examiner

*Primary Examiner* — Brian M O'Hara
(74) *Attorney, Agent, or Firm* — Lorenz & Kopf, LLP

(57) ABSTRACT

A method for automated processing of luggage in an aircraft is provided. The hold of the aircraft includes a device for automated processing of the luggage. The method includes the device for automated processing operating in an autonomous manner to load the luggage into the hold of the aircraft, with each item of luggage being packaged to this end in a packaging wrapper comprising visual markers. The method includes the device for automated processing viewing these visual markers.

11 Claims, 3 Drawing Sheets

METHOD FOR AUTOMATED AND ORDERLY PROCESSING OF LUGGAGE IN AN AIRCRAFT

CROSS-REFERENCE TO RELATED APPLICATION

This application claims priority to French Patent Application No. 12 62145, filed Dec. 17, 2012, which is incorporated herein by reference in its entirety.

TECHNICAL FIELD

This application pertains to a method for automated processing of luggage in an aircraft, and to an aircraft hold comprising a device for automated processing of luggage for implementing this method.

BACKGROUND

In air transport, what are known as "low-cost" airlines provide flights at very low prices. Thus, in order to be able to generate sufficient profits, these airlines are constantly seeking to increase the frequency of flights so as to realize more return journeys in a day. To this end, each step of a return journey is optimized so as to reduce the duration thereof The present disclosure aims to reduce the duration of a turnaround step that starts on arrival of the aircraft at the terminal and ends when the aircraft sets off for the taxiway for the purpose of taking off This step can be broken down into different phases:
Disembarkation and boarding of passengers,
Cleaning of the aeroplane,
Loading of passengers' needs: food, drink, etc.,
Refuelling, etc., and
Unloading and loading of passengers' luggage.

The present disclosure relates more particularly to the loading and unloading of passengers' luggage into and out of the hold.

According to a first known method, the loading and unloading of luggage into and out of the hold is carried out using containers.

Before the flight, the items of luggage are preloaded manually into containers which are then loaded into the hold of the aircraft, and after the flight the containers are unloaded and then emptied manually, the items of luggage being provided to the passengers piece by piece on conveyors.

This first method, which is entirely manual, does not satisfy passengers who have to wait a long time in order to check-in their luggage before the flight and to collect their luggage after the flight. In addition, manual loading and unloading are arduous and expensive operations.

According to a second known method, the loading and unloading of luggage into and out of the hold is carried out by way of transfer platforms on which the items of luggage are loaded and unloaded in an automated manner, as is described in the document WO-2006/040421.

The automated processing of the luggage which is described in said document WO-2006/040421 makes it possible to reduce the duration of the turnaround, but it does not allow continuous processing of the luggage, each transfer platform having to be filled before being sent towards the hold of the aircraft.

Consequently, before departure of the aircraft, the items of luggage cannot be loaded into the hold of the aircraft as the passengers arrive at the boarding gate, and on arrival, the passengers also have to wait for a certain amount of time before collecting their luggage.

In addition, this second method requires specific items of luggage having particular dimensions and rack driving means. From a general point of view, the waiting times for dropping off and collecting the luggage cause the passengers not to have it loaded in the hold.

In addition, the passengers, who are in a hurry to exit the aircraft and collect their luggage, prefer to load their luggage into the luggage compartments in the cabin.

However, these luggage compartments located in the cabin are not intended to hold numerous items of luggage, especially since passengers tend to board with increasingly voluminous luggage.

In addition, the loading and unloading of the luggage compartments by some passengers hampers the boarding and disembarkation of the other passengers, thereby extending the duration of these two phases of the turnaround.

In addition, other objects, desirable features and characteristics will become apparent from the subsequent summary and detailed description, and the appended claims, taken in conjunction with the accompanying drawings and this background.

SUMMARY

Thus, the various teachings of the present disclosure aim to remedy the drawbacks of the prior art relating to the loading and unloading of luggage into and out of the hold, and consequently to reduce the amount of luggage loaded into the luggage compartments in the cabin by encouraging the passengers to load their luggage into the hold.

With this aim in mind, the present disclosure proposes a method for automated processing of luggage in an aircraft, making it possible to shorten the passenger boarding and disembarkation phases.

According to the various teachings of the present disclosure, with the hold of the aircraft comprising a device for automated processing of the luggage, the method is characterized in that the device for automated processing operates in an autonomous manner to load the luggage into the hold of the aircraft, each item of luggage being packaged to this end in a packaging wrapper comprising visual markers, and the device for automated processing comprising to this end means for viewing these visual markers.

More specifically, the visual markers allow the device for automated processing to know, via its viewing means, the shapes and external dimensions of the items of luggage in order to load these items of luggage into the hold.

Still according to the present disclosure, the items of luggage are loaded into the hold of the aircraft in an order according to the order in which the passengers board the aircraft. Generally, in order to reduce the passenger boarding time, the items of luggage are loaded into the hold of the aircraft in the order in which the passengers board the aircraft.

In the method according to the present disclosure, the items of luggage are loaded into the hold of the aircraft in an individualized manner by the device for automated processing of luggage.

According to the present disclosure, the items of luggage are unloaded in an automated manner from the hold of the aircraft in an order according to the order in which the passengers disembark from the aircraft. In one example, in order to reduce the passenger disembarkation time, the items of luggage are unloaded from the hold of the aircraft in the order in which the passengers disembark from the aircraft.

In the method according to the present disclosure, the items of luggage are unloaded individually from the hold of the aircraft by the device for automated processing of luggage.

Still in order to reduce the passenger disembarkation time, the items of luggage may be unloaded from the hold on a conveyor located outside the aircraft and in the vicinity of the hold.

In order to make it easier to process them, and before being loaded into the hold of the aircraft, each item of luggage is packaged in a packaging wrapper in the form of a protective film which is used to compact the item of luggage to be processed.

In order to completely automate the individualized loading and unloading of the luggage, the items of luggage may be packaged in an automated manner by a packaging device.

With the same objective, the items of luggage packaged in their wrapper may be conveyed in an automated manner towards the hold of the aircraft.

In order to make it easier to automate the individualized loading of the items of luggage, the various items of luggage to be processed have identical shapes and volumes.

In order to implement this method for automated processing of luggage in an aircraft, the present disclosure provides a specific packaging wrapper.

In one example, the wrapper is in the form of a protective film and is used to compact the item of luggage, the item of luggage being wrapped in the protective film under reduced pressure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 2:
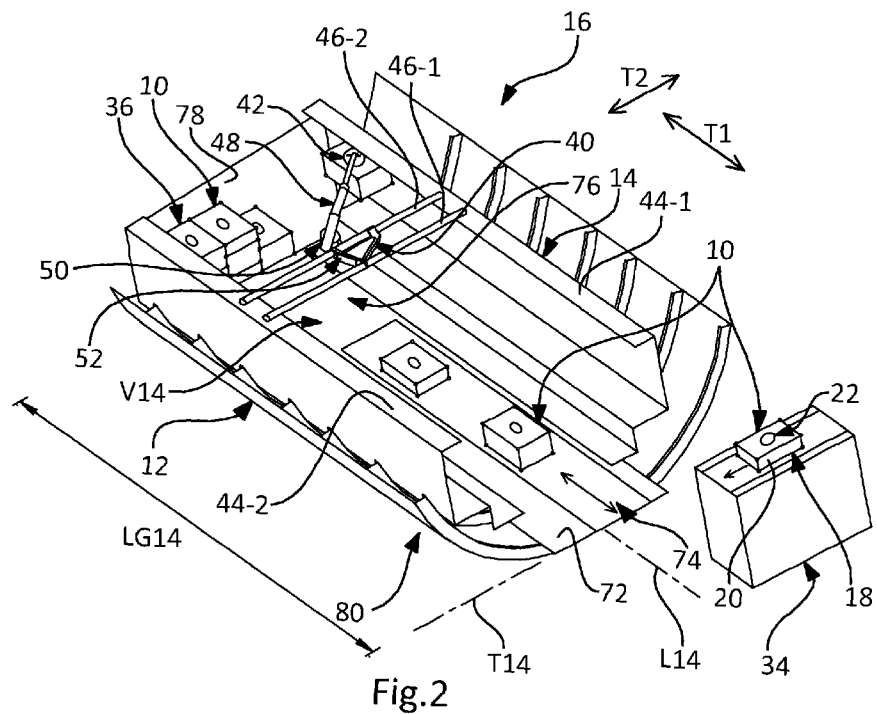
FIG. 2 is a partial view of an aircraft hold equipped with an exemplary embodiment of a device for automated processing.
Figure 3:
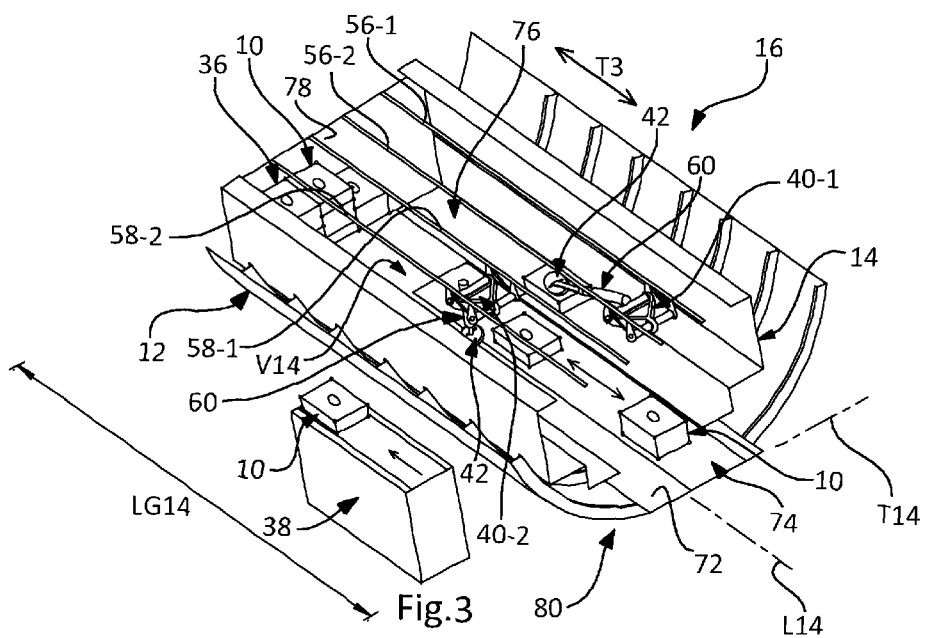
FIG. 3 is a partial view of an aircraft hold equipped with another exemplary embodiment of a device for automated processing.

The present disclosure relates to a method for automated processing of luggage 10 in an aircraft 12, the hold 14 of this aircraft 12 comprising a device 16 for automated processing of the luggage 10, as illustrated in FIGS. 2 and 3.

According to the various teachings of the present disclosure, the processing of the luggage 10 is understood to mean the conveying, grasping and handling of the luggage 10 in order to load it into the hold 14 and to unload it from this hold 14.

In addition, according to the present disclosure, an automated operation is understood to mean an operation carried out by a machine, without manual intervention, that is to say without involving the use of the force of an operator or technician.

In the method according to various embodiments, the items of luggage 10 are loaded into the hold 14 of the aircraft 12 in an automated manner by the device 16 for automated processing of luggage.

According to the present disclosure, loading is understood to mean the operation of storing the luggage 10 in an orderly manner in the hold 14.

According to the present disclosure, orderly loading has the objective of storing as many items of luggage 10 in the hold 14 as possible without wasting volume.

During the loading operation, use may be made of retaining means such as nets known from the prior art to ensure the stability of the luggage 10 as it is being loaded into the hold 14. Advantageously, these retaining means also ensure the stability of the loaded luggage 10 during the flight of the aircraft.

Unlike the preloading in containers of the prior art, in the present disclosure the items of luggage 10 are loaded individually into the hold 14 of the aircraft 12 by the device 16 for automated processing of luggage.

According to the present disclosure, individually is understood to mean that the items of luggage 10 are loaded into the hold 14 one by one by the device 16 for automated processing.

In order to be handled by the device 16 for automated processing, and just before it is loaded into the hold 14 of the aircraft, each item of luggage 10 is packaged in a packaging wrapper 18 in the form of a protective film 20.

Figure 1:
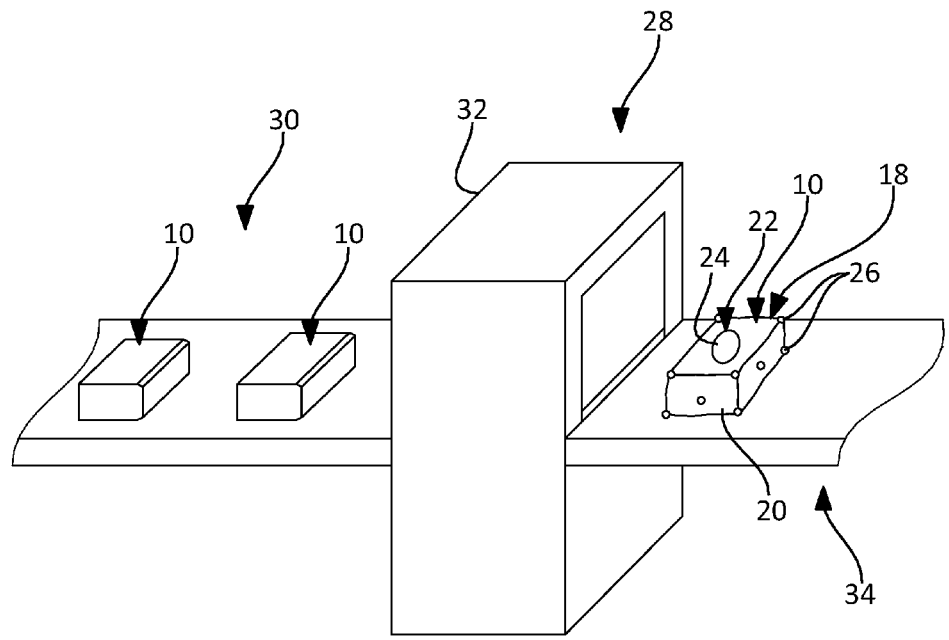
FIG. 1 is a perspective view of an automated luggage packaging device according to various embodiments.

In order for the luggage 10 to be handled by the device 16, this packaging wrapper 18 comprises a grasping surface 22 separate from but secured to the protective film 20, as shown in FIG. 1.

In one embodiment, the surface 22 is suitable for grasping by way of reduced pressure. To this end, the surface 22 is smooth. In another embodiment, the surface 22 is suitable for magnetic grasping. To this end, the surface 22 is magnetizable.

In the various embodiments, the grasping surface 22 is carried by a disc 24. Thus, in one embodiment, the disc 24 may be produced from a plastics material, whereas in the other embodiment, the disc 24 may be produced from a metal material.

The protective film 20 is made of plastics material, optionally reinforced by a network of glass fibres. For secure handling, the items of luggage 10 are wrapped in the protective film 20 under slightly reduced pressure. In addition to its function relating to the handling of an item of luggage 10, this protective film 20 protects the item of luggage 10 from knocks during its processing.

The protective film 20 also serves as proof that the item of luggage 10 has not been tampered with, it being possible to verify the integrity of the film 20 visually and rapidly, when it is checked by an employee of the terminal or by the passenger after disembarking, in order to ensure that the item of luggage 10 has not been opened.

The protective film 20 also makes it possible to avoid accidental opening of the item of luggage 10. The protective film 20 makes it possible above all to press the handles, straps or any other element against the main body of the item of luggage 10, thereby avoiding any inconvenience during the handling and conveying of the item of luggage 10.

According to another advantage, the wrapper 18 may be used to compact each item of luggage 10 to be processed. To this end, each item of luggage 10 is wrapped in the protective film 20 under slightly reduced pressure. This compacting of the items of luggage 10 makes it easier to process them, for example by creating approximately planar lower and upper faces, and to load them into the hold 14 without wasting volume.

In order to automate the method for individualized processing, the wrapper 18 may comprise an intelligent label in which different information relating to the packaged item of luggage 10 and useful for the automated processing of the luggage 10 is stored.

In parallel, the device 16 for automated processing comprises means for reading these intelligent labels. Thus, the device 16 for automated processing may use the information contained in the intelligent labels to improve the processing of the luggage 10. In one example, the information contained in the intelligent label relates to the shape and external dimensions of the item of luggage 10. In addition, the device 16 for automated processing uses this information to carry out the individualized loading of the luggage 10 into the hold 14.

By virtue of the acquisition of this information relating to the shape and external dimensions of each item of luggage 10, the device 16 for automated processing can arrange the various items of luggage 10 in the hold 14 without wasting volume.

In order to improve the handling carried out by the device 16 for automated processing, the information contained in the intelligent label may relate to: the centre of gravity of the item of luggage 10, its weight, the type of luggage 10 and the category of the luggage 10: fragility, danger, etc.

For example, knowledge of the position of the centre of gravity of the item of luggage 10 allows the device 16 for automated processing to handle the item of luggage 10 without the latter tending to tip, and therefore without having to oppose a tipping torque.

In order to favour the traceability of the items of luggage 10, the information contained in the intelligent label may relate to: the identity of the passenger who owns the luggage 10 and the identification of the aircraft 12 in which the luggage 10 is intended to be loaded.

In order to automate the method for individualized processing, the wrapper 18 may comprise visual markers 26. In parallel, the device 16 for automated processing comprises means for viewing these visual markers 26, such as cameras and suitable means for processing images. The viewing means of the device 16 operate as motion capturing means, the visual markers 26 being the markings that are useful for this capturing.

By virtue of the visual markers 26, and with the device 16 for automated processing being aware in a virtual manner of the environment of the hold 14, the device 16 for automated processing can locate virtually an item of luggage 10 in the hold 14. It is thus not necessary for the items of luggage 10 to arrive at a precise location and in a precise orientation in order to be handled by the device 16 for automated processing. The virtual environment of the hold 14 may be acquired by the device 16 for automated processing in various ways.

In one embodiment, the hold 14 of the aircraft 12 is digitally modelled by an external device, then the virtual environment created in this way is acquired by the device 16 for automated processing.

In another embodiment, the hold 14 of the aircraft is equipped with visual targets, which are similar to the visual markers 26 with which the wrapper 18 of the items of luggage 10 is equipped, and are detectable by the viewing means of the device 16 for automated processing in order to digitally model the hold 14.

As an alternative to the intelligent labels, the visual markers 26 allow the device 16 for automated processing to know, via its viewing means, the shape and external dimensions of the item of luggage 10. By virtue of the visual markers 26, items of luggage 10 having different shapes and different dimensions may be processed by the device 16 for automated processing. In addition, the device 16 for automated processing may use the information provided by the visual markers 26 to load the items of luggage 10 into the hold 14, and more particularly to arrange the various items of luggage 10 in the hold 14 without wasting volume.

In order to improve the handling carried out by the device 16 for automated processing, the information provided by the visual markers 26 may also make it possible to determine: the centre of gravity of the item of luggage 10, the type of luggage 10, etc. By virtue of the intelligent labels and/or the visual markers 26 of the wrappers 18 of the items of luggage 10 and/or the visual targets with which the hold 14 is equipped, the device 16 for automated processing allows autonomous or semi-autonomous loading of the items of luggage 10, as described in detail below.

In order to completely automate the method for individualized processing according to the various teachings of the present disclosure, the items of luggage 10 are packaged in an automated manner by a packaging device 28, such as the one illustrated in FIG. 1.

This packaging device 28, which is for example provided in the loading bays of a terminal in the vicinity of each loading bridge, comprises an input conveyor 30 on which the items of luggage 10 to be packaged are placed, a device 32 for automatically packaging each item of luggage 10 in a protective wrapper 18, and an output conveyor 34 on which the packaged items of luggage 10 travel.

In one example, the automated packaging of the items of luggage 10 takes place just before the passengers board. Advantageously, the packaging device 28 implements the compacting of the items of luggage 10.

To this end, provision may be made of an upper plate and a lower plate which squash the item of luggage 10 during the packaging thereof, the squashing being controlled such that the degree of squashing approaches a pressure corresponding to that which can be applied to an item of luggage when the item of luggage is positioned under other items of luggage.

In order to facilitate the automated packaging of the items of luggage 10 and to favour optimal filling of the hold 14 by the device 16 for automated processing, the various items of luggage 10 to be processed ideally have substantially identical shapes, for example parallelepipedal shapes, and volumes, these being for example imposed by the airline by way of a company premium policy. As a variant, prepackaged items of luggage 10 incorporating the protective wrapper 18 with the grasping surface 22 may be provided and, for example, sold to the passengers by the airline.

In order to completely automate the method for individualized processing, the items of luggage 10 packaged in their wrapper 18 may be conveyed in an automated manner towards the hold 14 of the aircraft 12. For example, as illustrated in FIG. 2, the output conveyor 34 of the packaging device 28 can transport the packaged items of luggage 10 as far as the entrance of the hold 14 of the aircraft.

In the method for automated and individualized processing according to the various teachings of the present disclosure, the items of luggage 10 are also unloaded in an automated manner from the hold 14 of the aircraft 12 by the device 16 for automated processing of luggage.

As in the case of loading, the items of luggage 10 are unloaded individually from the hold 14 of the aircraft 12 by the device 16 for automated processing of luggage.

According to the present disclosure, unloading is understood to be the operation in which each item of luggage 10 of the set 36 of items of luggage 10 stored in an orderly manner in the hold 14 is separated.

By virtue of the intelligent labels and/or the visual markers 26 of the wrappers 18 of the items of luggage 10 and/or the visual targets with which the hold 14 is equipped, the device 16 for automated processing affords autonomous or semi-autonomous unloading of the items of luggage 10, as explained in detail below.

Advantageously, the items of luggage 10 are unloaded from the hold 14 on a conveyor 38 located outside the aircraft 12 and in the vicinity of the hold 14. This conveyor 38 makes the items of luggage 10 available to the passengers, who can thus collect their luggage 10 directly on disembarking from the aircraft 12.

According to the present disclosure, the items of luggage 10 are loaded into the hold 14 of the aircraft 12 in an order according to the order in which the passengers board the aircraft. In one example, in order to make the passenger boarding phase more fluid, the items of luggage 10 are loaded into the hold 14 of the aircraft 12 in the order in which the passengers board the aircraft. The arrival of the items of luggage 10 in the hold 14 of the aircraft 12 in the same order as the passengers is favoured by the presence of the packaging device 28 in the loading bay in the vicinity of the loading bridge.

Specifically, the items of luggage 10 are placed by the passengers on the input conveyor 30 of the packaging device 28 as they board, then these items of luggage 10 are packaged and conveyed automatically towards the hold 14 of the aircraft in the order in which the passengers board.

Similarly, according to the present disclosure, the items of luggage 10 are unloaded from the hold 14 of the aircraft 12 in an order according to the order in which the passengers disembark from the aircraft. In one example, in order to make the passenger disembarkation phase more fluid, the items of luggage 10 are unloaded from the hold 14 of the aircraft 12 in the order in which the passengers disembark from the aircraft.

Thus, in the case in which the passengers disembark in the reverse order to the order in which they boarded, the items of luggage 10 are loaded into the hold 14 of the aircraft in the order in which the passengers board, and they may be unloaded in the order in which the passengers disembark.

In an optimized variant of the method for individualized processing according to the present disclosure, the device 16 for automated processing operates in an autonomous manner. According to the present disclosure, autonomous operation is understood to mean operation without any human intervention.

The device 16 for automated processing operates in an autonomous manner at least in order to load the luggage 10 into the hold 14 of the aircraft 12. Such autonomous loading is made possible by the visual markers 26 present on the items of luggage 10 and by the viewing means of the device 16 for automated processing, and optionally by the intelligent labels with which the items of luggage 10 are equipped and by the means for reading these labels with which the device 16 is provided. Of course, the device 16 for processing is programmed in order to implement such an autonomous loading operation.

In this autonomous operating mode, the device 16 for processing is capable of viewing, locating, identifying, grasping and handling on its own and automatically the items of luggage 10 arriving in the hold 14 of the aircraft 12.

For example, in order to identify each item of luggage 10, the device 16 for processing assigns a different index to each item of luggage 10.

Advantageously, by virtue of the viewing of the shapes and dimensions of the various items of luggage 10, of the virtual knowledge of the environment of the hold 14 of the aircraft, and of an appropriate program, the device 16 for automated processing is capable of arranging various items of luggage 10 in the hold 14 without wasting volume.

The device 16 for automated processing may also operate in an autonomous manner in order to unload the luggage 10 from the hold 14 of the aircraft 12.

In addition, the operation of the various conveyors 30, 34, 38 and/or of the packaging device 28 may also be easily rendered autonomous with the aid of different sensors and appropriate programs. In a less optimized variant of the method for individualized processing according to the present disclosure, the operation of the device 16 for automated processing is semi-autonomous. According to the present disclosure, semi-autonomous is understood to mean operation that is partially controlled by an operator.

In one example, the operation of the device 16 for automated processing is remote-controlled by an operator. To this end, the operator may be fully immersed in the hold 14 from his office by way of a touch screen or a head-mounted display. This remote-control station for the device 16 may be located at the entrance to the hold 14, in the cabin of the aircraft 12, or even in the terminal.

In order to implement this semi-autonomous operation, provision may be made of immersive means which allow the operator to be transposed virtually into the hold 14 of the aircraft, the virtual environment of the hold 14 having been acquired beforehand by the device 16 for automated processing.

Advantageously, remote work by the operator is assisted and facilitated by the visual markers 26 present on the items of luggage 10 and by the viewing means of the device 16 for automated processing, and optionally by the intelligent labels with which the items of luggage 10 are equipped and by the means for reading these labels with which the device 16 is provided.

Specifically, as in the autonomous operating mode, the device 16 for processing is capable of viewing, locating and identifying on its own and automatically the items of luggage 10 arriving in the hold 14 of the aircraft 12.

Subsequently, all that the operator has to do is to guide the device 16 for automated processing, via the touch screen or the immersive means, in order to effect the grasping and handling of the items of luggage 10 in order to arrange various items of luggage 10 in the hold 14 without wasting volume.

For example, in the case of semi-autonomous loading of the luggage, the role of the operator is to select, via the touch screen, one of the items of luggage 10 identified by an index, and to indicate to the device 16 for automated processing, still via the touch screen, where the selected item of luggage 10 should be deposited in the hold 14, the device 16 being programmed to effect on its own the grasping and handling of the item of luggage 10 as far as the location indicated by the operator, this sequence being repeated by the operator for each item of luggage 10 to be loaded.

Alternatively, in a more automated procedure, all that the operator has to do is to select the items of luggage 10 one after the other, the device 16 being programmed to find on its own the most appropriate location for depositing each selected item of luggage 10 in the hold 14, and to effect on its own the grasping and handling of the selected item of luggage 10 as far as the most appropriate location.

The device 16 for automated processing may operate in a semi-autonomous manner in order to load the luggage 10 into the hold 14 of the aircraft 12 and to unload the luggage 10 from the hold 14 of the aircraft 12.

Since the operation of the various conveyors 30, 34, 38 and that of the packaging device 28 are linked to that of the device 16 for automated processing, these operations are also semi-autonomous.

The present disclosure also provides a design of an aircraft 12 hold 14 for implementing the method for automated and individualized processing which has just been described.

As indicated above, the hold 14 allowing this implementation of the method comprises a device 16 for automated processing of luggage 10. This device 16 for automated processing of luggage 10 is installed on board since it is always present in the hold 14 of the aircraft.

In the present description, the longitudinal axis L14 of the hold is an approximately horizontal axis parallel to the aeroplane axis extending from the front to the rear of the aircraft, and the transverse axis T14 of the hold 14 is an approximately horizontal axis perpendicular to this aeroplane axis.

Figure 4:
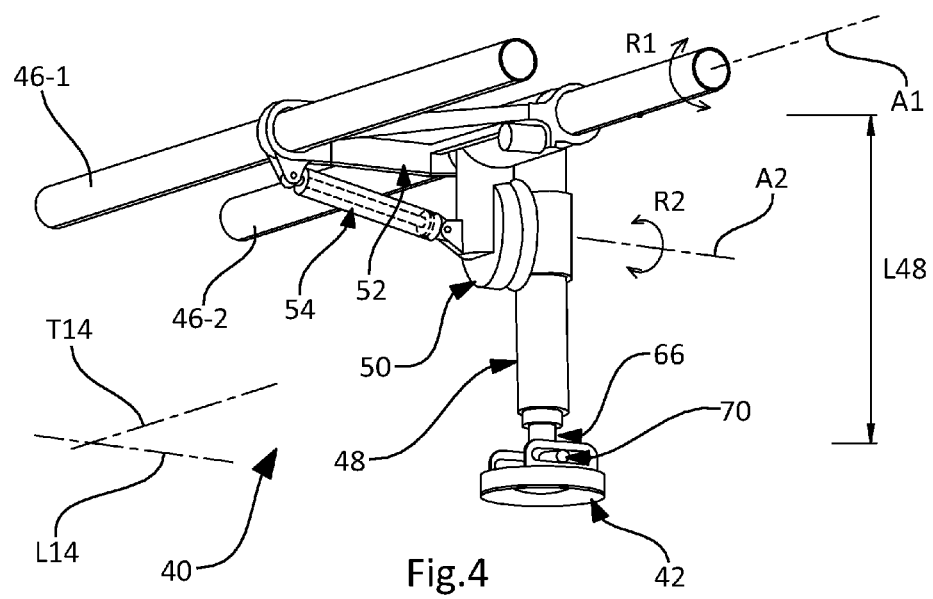
FIG. 4 is a perspective view of an automated arm of an exemplary embodiment of a device for automated processing.

In one exemplary embodiment illustrated in FIGS. 2 and 4, this device 16 for automated processing comprises a single automated arm 40 for handling the luggage 10, this automated arm 40 being mounted so as to be able to move in translation T1 parallel to the longitudinal axis L14 of the hold 14 of the aircraft 12. Advantageously, the automated arm 40 may move in translation along the entire length LG14 of the hold 14.

In order to handle the items of luggage 10, this automated arm 40 comprises a head 42 for grasping an item of luggage 10. In one embodiment of the automated arm 40, the grasping head 42 functions with reduced pressure. To this end, this grasping head 42 is for example in the form of a suction cup. In another embodiment of the automated arm 40, the grasping head 42 operates by magnetism. To this end, this grasping head 42 comprises for example an electromagnet.

In order to facilitate the grasping of each item of luggage 10 by the grasping head 42, the grasping surface 22 of the wrapper 18 has a diameter greater than the diameter of the grasping head 42, in the first or in the second variant of the automated arm 40.

In one embodiment, the automated arm 40 is also mounted so as to be able to move in translation T2 substantially parallel to the transverse axis T14 of the hold 14 of the aircraft. In addition, the automated arm 40 affords first mobility in rotation R1 about a first axis A1 parallel to the transverse axis T14 of the hold 14 of the aircraft 12, and second mobility in rotation R2 about a second axis A2 perpendicular to the first axis A1.

In order to obtain such mobilities of the arm 40, provision is made of two longitudinal members 44-1, 44-2 fixed on either side of the hold 14 parallel to the longitudinal axis L14 of the latter, and also two transverse members 46-1, 46-2 that slide substantially perpendicularly to the longitudinal axis L14 on these two longitudinal members 44-1, 44-2.

In addition, the arm 40 comprises a body 48 that is mounted in a rotational manner on a mounting plate 50 that is mounted in a pivoting manner on a slide 52 that moves in translation on the transverse members 46-1, 46-2. The rotation R2 of the body 48 with respect to the mounting plate 50 and the translational movement T2 of the slide 52 with respect to the transverse members 46-1, 46-2 may be driven by motors, while the rotation R1 of the mounting plate 50 with respect to the slide 52 may be driven by an actuator 54.

By virtue of its various mobilities, the arm 40 may move in the entire volume V14 of the hold 14. Advantageously, the various mobilities of the automated arm 40 may be used simultaneously.

Figure 5:
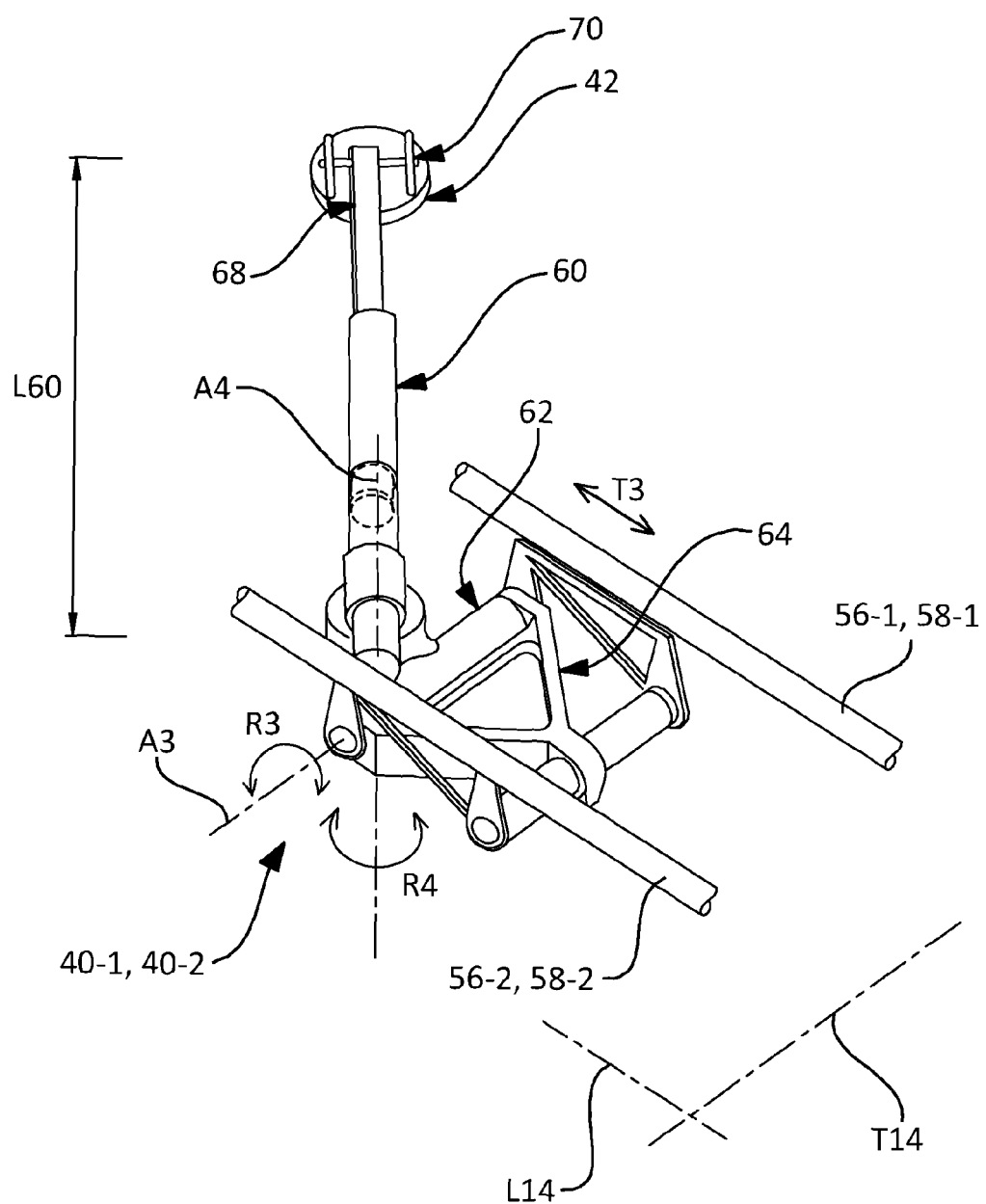
FIG. 5 is a perspective view of automated arms of another exemplary embodiment of a device for automated processing.

In one exemplary embodiment illustrated in FIGS. 3 and 5, the device 16 for automated processing comprises two automated arms 40-1, 40-2 for handling luggage 10, these automated arms 40-1, 40-2 being mounted so as to be able to move in translation T3 substantially parallel to one another and substantially parallel to the longitudinal axis L14 of the hold 14 of the aircraft 12.

Advantageously, the automated arms 40-1, 40-2 may move in translation along the entire length LG14 of the hold 14. In order to handle the items of luggage 10, each of these automated arms 40-1, 40-2 comprises a head 42 for grasping an item of luggage 10. In one embodiment of the automated arms 40-1, 40-2, the grasping head 42 operates with reduced pressure. To this end, this grasping head 42 is for example in the form of a suction cup. In another embodiment of the automated arms 40-1, 40-2, the grasping head 42 operates by magnetism. To this end, this grasping head 42 comprises for example an electromagnet.

In order to facilitate the grasping of each item of luggage 10 by the grasping head 42, the grasping surface 22 of the wrapper 18 has a diameter greater than the diameter of the grasping head 42, in the first or the second embodiment of the automated arms 40-1, 40-2.

In this exemplary embodiment, each automated arm 40-1, 40-2 also affords first mobility in rotation R3 about a first axis A3 parallel to the transverse axis T14 of the hold of the aircraft 12, and second mobility in rotation R4 about a second axis A4 perpendicular to the first axis A3.

In order to obtain such mobilities, provision is made, for each automated arm 40-1, 40-2, of two longitudinal members 56-1, 56-2 and 58-1, 58-2 which are fixed parallel to the longitudinal axis L14 of the hold 14, each automated arm 40-1, 40-2 sliding substantially parallel to the longitudinal axis L14 on these two longitudinal members 56-1, 56-2 and 58-1, 58-2.

In addition, each automated arm 40-1, 40-2 comprises a body 60 that is mounted in a rotational manner on a mounting plate 62 that is mounted in a pivoting manner on a slide 64 that moves in translation on the longitudinal members 56-1, 56-2 and 58-1, 58-2. The rotation R4 of the body 60 with respect to the mounting plate 62 and the translational movement T3 of the slide 64 with respect to the longitudinal members 56-1, 56-2 and 58-1, 58-2 may be driven by motors, while the rotation R3 of the mounting plate 62 with respect to the slide 64 may be driven by an actuator.

By virtue of their various mobilities, the arms 40-1, 40-2 cover the entire volume V14 of the hold 14. Advantageously, the two arms 40-1, 40-2 operate independently, and the various mobilities of each of the arms 40-1, 40-2 can be used simultaneously. In a semi-autonomous operating mode, the arms 40-1, 40-2 are in one example, remote-controlled by different operators.

In the exemplary embodiments of the device 16 for automated processing, each automated arm 40, 40-1, 40-2 comprises a body 48, 60 having an extendable length L48, L60. To this end, a body 48, 60 has a telescopic design, having three strands for example.

Still in the exemplary embodiments of the device 16 for automated processing, with the grasping head 42 being mounted at the lower end 66, 68 of the body 48, 60, the grasping head 42 is mounted at this lower end 66, 68 by way of a pivot 70, in one example, with springback.

Still in the exemplary embodiments of the device 16 for automated processing, provision may be made for the floor 72 of the hold 14 of the aircraft 12 to comprise a luggage conveyor 74 disposed substantially parallel to the longitudinal axis L14 of the hold 14 of the aircraft.

In one example, this conveyor 74 extends as far as close to the bottom 76 of the hold 14, it thus being possible for the arm or arms 40, 40-1, 40-2 to work without moving in longitudinal translation T1, T3 in the bottom 76 of the hold 14 at the beginning of loading or at the end of unloading. This complementary conveyor 74, which is useful both during loading and during unloading of the luggage 10, creates a transition zone in which the items of luggage 10 may be temporarily stored.

By making it possible to limit the number and amplitude of longitudinal translational movements T1, T3 of the automated arms 40, 40-1, 40-2 in the length of the hold 14, this conveyor 74 makes it possible to accelerate the processing of the luggage 10, both during the loading and during the unloading thereof During loading in autonomous or semi-autonomous operation, the items of luggage 10 are conveyed by the conveyor 74 towards the bottom 76 of the hold 14, where they are grasped and then stacked by the automated arm or arms 40, 40-1, 40-2 waiting at the bottom 76 of the hold 14.

At the start of a loading operation, the items of luggage 10 are stacked by the automated arm or arms 40, 40-1, 40-2 against the transverse wall 78 of the bottom 76 of the hold 14 and are superposed over the entire height of the hold 14 until they form a row taking up the available space to the greatest possible extent.

Next, during loading, the automated arm or arms 40, 40-1, 40-2 move progressively in longitudinal translational movement T1, T3 towards the entrance 80 of the hold 14 so as to form rows of luggage 10, one after the other.

Once loading has been carried out, and thus during the flight of the aircraft 12, the automated arm or arms 40, 40-1, 40-2 remain stored close to the entrance 80 of the hold 14.

In addition, once the flight has been completed, unloading in autonomous or semi-autonomous operation takes place in the opposite way to loading: the rows of luggage 10 being destacked one after the other by the automated arm or arms 40, 40-1, 40-2, from the entrance 80 towards the bottom 76 of the hold 14 and by way of the conveyor 74.

By virtue of the present disclosure, passengers will have less interest in keeping their luggage in the cabin, and thus the volumes of luggage compartments may be reduced in order to provide greater comfort to the passengers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for automated processing of items of luggage in an aircraft having a hold, the hold of the aircraft comprising a device for automated processing of the items of luggage, the method comprising the steps of:
   packaging each item of luggage in an automated manner by a packaging device, the packaging device wrapping and compacting each item of luggage in a protective film comprising visual markers;
   viewing the visual markers with a viewing means of the device for automated processing; and
   loading the items of luggage in an automated manner into the hold of the aircraft by the device for automated processing, the device for automated processing operating in an autonomous manner to load the items of luggage into the hold of the aircraft at a location in the hold based on the viewed visual markers.

2. The method according to claim 1, wherein the visual markers allow the device for automated processing to know, via its viewing means, shapes and external dimensions of the items of luggage in order to load the items of luggage into the hold.

3. The method according to claim 1, wherein the items of luggage are loaded into the hold of the aircraft in an order according to an order in which passengers board the aircraft.

4. The method according to claim 1, wherein the items of luggage are loaded individually into the hold of the aircraft by the device for automated processing.

5. The method according to claim 1, wherein the device for automated processing operates in an autonomous manner to unload the items of luggage from the hold of the aircraft.

6. The method according to claim 5, wherein the items of luggage are unloaded in an automated manner from the hold of the aircraft in an order according to an order in which passengers disembark from the aircraft.

7. The method according to claim 5, wherein the items of luggage are unloaded from the hold of the aircraft in an order in which passengers disembark from the aircraft.

8. The method according to claim 5, wherein the items of luggage are unloaded individually from the hold of the aircraft by the device for automated processing.

9. The method according to claim 5, wherein the items of luggage are unloaded from the hold on a conveyor located outside the aircraft and in the vicinity of the hold.

10. The method according to claim 1, further comprising:
    conveying the items of luggage each packaged in the protective film in an automated manner towards the hold of the aircraft.

11. The method according to claim 1, wherein the items of luggage have identical shapes and volumes.

* * * * *